Patented July 10, 1928.

1,676,698

UNITED STATES PATENT OFFICE.

FRIEDRICH KRECKE, OF OFFENBACH, NEAR FRANKFORT-ON-THE-MAIN, GERMANY, ASSIGNOR TO GRASSELLI DYESTUFF CORPORATION, OF NEW YORK, N. Y., A CORPORATION OF DELAWARE.

2-HYDROXYNAPHTHALENE-3-MONOSULPHO-6-CARBOXYLIC ACID AND PROCESS OF MAKING IT.

No Drawing. Application filed June 2, 1927, Serial No. 196,148, and in Germany June 26, 1926.

My invention relates to a new 2-hydroxynaphthalene-6-carboxy-monosulphonic acid having probably the formula:

which acid is obtained by acting with sulphuric acid of at least 1, 82 specific gravity on 2-hydroxynaphthalene-6-carboxylic acid. When carrying out the process by acting at 50-80° with concentrated sulphuric acid of f. i. 66° Bé., a mixture of a plurality of monosulphonic acids is formed, which may be separated according to the different solubility of the neutral alkali metal salts, the neutral alkali metal salt of 2-hydroxynaphthalene-3-monosulpho-6-carboxylic acid separating at first.

When acting however with sulphuric acid containing free anhydride, advantageously at 20-50°, then at first a 2-hydroxynaphthalene-6-carboxy-disulphonic acid is formed, which may be converted into 2-hydroxynaphthalene-3-monosulpho-6-carboxylic acid by shortly warming the mass of sulphonation, diluted with water.

By subjecting the new monosulphonic acid to the alkali melt and splitting off the carboxylic group from the product thus obtained, the well known 2.3-dihydroxynaphthalene is obtained, whereby the aforesaid constitution formula of the new monosulphonic acid seems to be very probable.

The new monosulphonic acid may be used as intermediate for the production of dyestuffs.

The following examples will further illustrate my invention, the parts being by weight and all temperatures in centigrade degrees, but it is understood, that my invention is not limited to the particular proportions, reacting conditions or materials listed therein.

Example I.

400 parts of 2-hydroxynaphthalene-6-carboxylic acid are slowly introduced at 40-50° in 1350 parts of sulphuric acid of 66° Bé. Then the mixture is stirred for some hours while slowly increasing the temperature to 80°. The mass is poured on ice and the acid sodium salts of the formed sulphonic acids are separated by adding common salt, then the mixture of these salts is converted into the corresponding neutral salts by treatment with sodium carbonate and the neutral solution therefrom is evaporated until a crystalline separation begins. After cooling down the neutral disodium salt of 2-hydroxynaphthalene-3-monosulpho-6-carboxylic acid separates almost entirely in compact needles. From the filtrate the 2-hydroxynaphthalene-8-monosulpho-6-carboxylic acid may be obtained by adding hydrochloric acid.

By acidifying a solution of the disodium salt the new 2-hydroxynaphthalene-3-monosulpho-6-carboxylic acid is separated. It is soluble in hot water and is difficultly soluble in dilute acids. By adding common salt to an aqueous solution the acid is converted into the acid sodium salt. The acid is characterized by a blue fluorescence of its solutions in dilute alkali carbonate solutions and the difficultly soluble neutral calcium salt.

Example II.

400 parts of 2-hydroxynaphthalene-6-carboxylic acid are slowly introduced at 20-25° in 1000 parts of sulphuric acid monohydrate. Simultaneously 900 parts of oleum containing 60% of anhydride are added and then the mixture is stirred for some hours while slowly increasing the temperature to 50°. The mass is poured on ice and by adding common salt the acid disodium salt of a 2-hydroxynaphthalene-6-carboxy-disulphonic acid is formed, which is probably the 2-hydroxynaphthalene-1.3-disulpho-6-carboxylic acid. By shortly warming the aforesaid sulphuric acid solution of the disulphonic acid one sulphonic group is split off and the 2-hydroxynaphthalene-3-sulpho-6-carboxylic acid which is difficultly soluble in dilute sulphuric acid crystallizes almost entirely after cooling down. It is identical with the acid described in Example I.

I claim:

1. As a new compound a 2-hydroxynaphthalene-6-carboxy-monosulphonic acid having probably the formula:

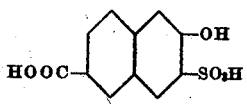

which is soluble in hot water, difficultly soluble in dilute acids, the disodium salt of which crystallizes in compact needles, which acid is characterized by a blue fluorescence of its solutions in dilute alkali carbonate solutions and its difficultly soluble neutral calcium salt, which acid is substantially identical with that obtainable by acting with sulphuric acid of at least 1,82 specific gravity on 2-hyrdoxynaphthalene-6-carboxylic acid.

2. A process for producing a new 2-hydroxynaphthalene-6-carboxy-monosulphonic acid having probably the formula:

which process comprises acting with sulphuric acid of at least 1,82 specific gravity on 2-hydroxynaphthalene-6-carboxylic acid.

3. A process for producing a new 2-hydroxynaphthalene-6-carboxy-monosulphonic acid having probably the formula:

which process comprises acting at moderately elevated temperatures with sulphuric acid of at least 1,82 specific gravity on 2-hydroxynaphthalene-6-carboxylic acid.

4. A process for producing a new 2-hydroxynaphthalene-6-carboxy-monosulphonic acid having probably the formula:

which process comprises acting at temperatures from about 20–100° with sulphuric acid of at least 1,82 specific gravity on 2-hydroxynaphthalene-6-carboxylic acid.

5. A process for producing a new 2-hydroxynaphthalene-6-carboxy-monosulphonic acid having probably the formula:

which process comprises acting at about 50–80° with concentrated sulphuric acid on 2-hydroxynaphthalene-6-carboxylic acid and separating from the mixture of different monosulphonic acids thus formed the 2-hydroxynaphthalene-3-monosulpho-6-carboxylic acid according to the less solubility of its neutral alkali metal salts.

6. A process for producing a new 2-hydroxynaphthalene-6-carboxy-monosulphonic acid having probably the formula:

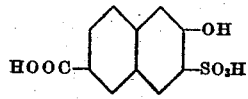

which process comprises acting at about 50–80° with concentrated sulphuric acid of 66° Bé. on 2-hydroxynaphthalene-6-carboxylic acid and separating from the mixture of different monosulphonic acids thus formed the 2-hydroxynaphthalene-3-monosulpho-6-carboxylic acid according to the less solubility of its neutral alkali metal salts.

7. A process for producing a new 2-hydroxynaphthalene-6-carboxy-monosulphonic acid having probably the formula:

which process comprises acting with sulphuric acid containing free anhydride on 2-hydroxynaphthalene-6-carboxylic acid and warming the mass of sulphonation, diluted with water, whereby a sulphonic group is split off from the formed disulphonic acid.

8. A process for producing a new 2-hydroxynaphthalene-6-carboxy-monosulphonic acid having probably the formula:

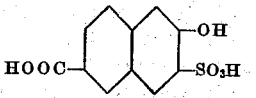

which process comprises acting at about 20–50° with sulphuric acid containing free anhydride on 2-hydroxynaphthalene-6-carboxylic acid and warming the mass of sulphonation, diluted with water, whereby a sulphonic group is split off from the formed disulphonic acid In testimony whereof, I affix my signature

FRIEDRICH KRECKE.